(12) United States Patent
Inada

(10) Patent No.: US 7,911,662 B2
(45) Date of Patent: Mar. 22, 2011

(54) LINEAR IMAGE SENSOR, IMAGE READING APPARATUS USING THE SAME, IMAGE READING METHOD, AND PROGRAM FOR IMPLEMENTING THE METHOD

(75) Inventor: Masakazu Inada, Kawasaki (JP)

(73) Assignee: Canon Kabushiki Kaisha (JP)

(*) Notice: Subject to any disclaimer, the term of this patent is extended or adjusted under 35 U.S.C. 154(b) by 1160 days.

(21) Appl. No.: 11/231,839

(22) Filed: Sep. 21, 2005

(65) Prior Publication Data

US 2006/0061835 A1   Mar. 23, 2006

(30) Foreign Application Priority Data

Sep. 21, 2004   (JP) ................... 2004-273406

(51) Int. Cl.
H04N 1/04 (2006.01)
H04N 1/46 (2006.01)
H01L 27/00 (2006.01)

(52) U.S. Cl. ......... 358/482; 358/483; 358/474; 358/513; 358/514; 358/505; 250/208.1

(58) Field of Classification Search ................ None
See application file for complete search history.

(56) References Cited

U.S. PATENT DOCUMENTS

| | | | |
|---|---|---|---|
| 6,009,214 A | 12/1999 | Suggs | |
| 6,307,661 B1 * | 10/2001 | Fujibayashi et al. | 359/207.1 |
| 6,496,286 B1 * | 12/2002 | Yamazaki | 358/514 |
| 7,327,500 B2 * | 2/2008 | Sakakibara et al. | 358/483 |
| 7,391,543 B2 * | 6/2008 | Ohara | 358/483 |
| 7,535,600 B2 * | 5/2009 | Choon | 358/474 |

FOREIGN PATENT DOCUMENTS

JP   10-327294 A   12/1998

* cited by examiner

Primary Examiner — Mark K Zimmerman
Assistant Examiner — Mesfin Getaneh
(74) Attorney, Agent, or Firm — Rossi, Kimms & McDowell LLP

(57) ABSTRACT

A linear image sensor which has an enhanced image resolution, and requires reduced processing time, and is low in cost. A first line sensor has a plurality of light receiving elements linearly arranged at a predetermined pitch in a main scanning direction. A second line sensor has a plurality of light receiving elements linearly arranged at the predetermined pitch in the main scanning direction. The light receiving elements of the second line sensor are shifted from the light receiving elements of the first line sensor by half the predetermined pitch in the main scanning direction. The second line sensor has a length in the main scanning direction shorter than that of the first line sensor, and is arranged in parallel to the first line sensor and spaced from the first line sensor by a predetermined distance in a sub scanning direction perpendicular to the main scanning direction.

8 Claims, 6 Drawing Sheets

LINEAR IMAGE SENSOR, IMAGE READING APPARATUS USING THE SAME, IMAGE READING METHOD, AND PROGRAM FOR IMPLEMENTING THE METHOD

BACKGROUND OF THE INVENTION

1. Field of the Invention

The present invention relates to a linear image sensor, an image reading apparatus, an image reading method, and a program, and in particular to a linear image sensor capable of reading an image at different degrees of image resolution, an image reading apparatus using the linear image sensor, an image reading method applied to the image reading apparatus, and a program for causing a computer to implement the image reading method.

2. Description of the Related Art

In general, in an image reading apparatus such as an image scanner, a light receiving unit that reads an image, and converts the read image into an electric signal is comprised of a linear image sensor formed of photo sensors (photoelectric conversion elements) arranged in an array. Such a light receiving unit has pixels corresponding in number to the size of an original to be subjected to image reading, as well as to the sampling density. Further, the light receiving unit is generally comprised of a plurality of sensors with color filters corresponding to red, green and blue colors, respectively.

Conventionally, there has been known an image reading apparatus which reads an image at a resolution of not more than 2400, for example, dpi by receiving light reflected from an original. When it is desired to read a transparent original, such as a photo film, at a resolution of e.g. 4800 dpi, it is necessary to increase the sensor element density of the light receiving unit. However, there is a limit to increase of the sensing element density within a limited space.

To address the problem, U.S. Pat. No. 6,496,286 has proposed an image reading apparatus which employs two rows of linear image sensors having the same image resolution and arranged at the same pitch, one of the sensor arrays being shifted from the other by half the pitch. Image signals are read alternately from sensor elements of one of the two linear image sensors and sensor elements of the other in a zigzag manner, and a spatial positional difference between the two linear image sensors is compensated to double the above resolution.

Further, Japanese Laid-Open Patent Publication (Kokai) No. H10-327294 has proposed an image reading apparatus which has a linear image sensor with an enhanced resolution in addition to a linear image sensor with a normal resolution, and in which these linear image sensors are selectively used to carry out image reading at different resolutions.

However, in general, cases where reading of transparent originals, such as a photo film, which generally requires enhanced resolution reading occur at a lower frequency than cases where reading of originals at a normal resolution. Nonetheless, if enhanced resolution reading is always carried out, image reading at a normal resolution involves unnecessary image processing, taking an unnecessarily long time for the processing to be carried out.

Moreover, for the image reading at an enhanced resolution, which takes place only at low frequency, an expensive linear image sensor with a high resolution is required, increasing the cost of the image reading apparatus.

SUMMARY OF THE INVENTION

It is an object of the present invention to provide a linear image sensor which has an enhanced image resolution, and requires reduced processing time, and is low in cost, as well as an image reading apparatus using the image sensor, an image reading method applied to the image reading apparatus, and a program for implementing the method.

To attain the above object, in a first aspect of the present invention, there is provided a linear image sensor comprising a first line sensor having a plurality of photoelectric conversion elements linearly arranged at a predetermined pitch in a main scanning direction, and a second line sensor having a plurality of photoelectric conversion elements linearly arranged at the predetermined pitch in the main scanning direction, the photoelectric conversion elements of the second line sensor being shifted from the photoelectric conversion elements of the first line sensor by half the predetermined pitch in the main scanning direction, wherein the second line sensor has a length in the main scanning direction shorter than that of the first line sensor, and is arranged in parallel to the first line sensor and spaced from the first line sensor by a predetermined distance in a sub scanning direction perpendicular to the main scanning direction.

Preferably, the first line sensor comprises a plurality of line sensors having the plurality of photoelectric conversion elements linearly arranged at a same phase and at a same pitch in the main scanning direction, the second line sensor comprises a plurality of line sensors linearly having the plurality of photoelectric conversion elements arranged at a same phase and at a same pitch in the main scanning direction, the linear image sensor comprises a plurality of color filters corresponding to respective colors, arranged on respective to the plurality of line sensors of the first line sensor, and a plurality of color filters corresponding to the respective colors, arranged on respective optical paths to the plurality of line sensors of the second line sensor, and one of the plurality of line sensors of the first line sensor corresponding to a first color and one of the plurality of line sensors of the second line sensor corresponding to the first color are arranged in proximity to each other, and another one of the plurality of line sensors of the first line sensor corresponding to a second color and another one of the plurality of line sensors of the second line sensor corresponding to the second color are arranged in proximity to each other.

Alternatively, the first line sensor comprises a plurality of line sensors having the plurality of photoelectric conversion elements linearly arranged at a same phase and at a same pitch in the main scanning direction, the second line sensor comprises a plurality of line sensors having the plurality of photoelectric conversion elements linearly arranged at a same phase and at a same pitch in the main scanning direction, the linear image sensor comprises a plurality of color filters corresponding to respective colors, arranged on respective to the plurality of line sensors of the first line sensor, and a plurality of color filters corresponding to the respective colors, arranged on respective optical paths to the plurality of line sensors of the second line sensor, and one of the plurality of line sensors of the first line sensor corresponding to a first color and one of the plurality of line sensors of the first line sensor corresponding to a second color are arranged in proximity to each other, and another one of the plurality of line sensors of the second line sensor corresponding to the first color and another one of the plurality of line sensors of the second line sensor corresponding to the second color are arranged in proximity to each other.

Preferably, the linear image sensor further comprises a transfer register that transfers electric charges from all the photoelectric conversion elements of the fist line sensor, and a transfer register that transfers electric charges from only a portion of the photoelectric conversion elements of the fist line sensor facing the second line sensor.

Also preferably, the first line sensor has a reading range having a length corresponding to a shorter side of an A4 sized original.

Also preferably, the second line sensor has a reading range having a length corresponding to a shorter side of a photo film original.

To attain the above object, in a second aspect of the present invention, there is provided an image reading apparatus comprising a linear image sensor comprising a first line sensor having a plurality of photoelectric conversion elements linearly arranged at a predetermined pitch in a main scanning direction, and a second line sensor having a plurality of photoelectric conversion elements linearly arranged at the predetermined pitch in the main scanning direction, the photoelectric conversion elements of the second line sensor being shifted from the photoelectric conversion elements of the first line sensor by half the predetermined pitch in the main scanning direction, wherein the second line sensor has a length in the main scanning direction shorter than that of the first line sensor, and is arranged in parallel to the first line sensor and spaced from the first line sensor by a predetermined distance in a sub scanning direction perpendicular to the main scanning direction, and an image data processing circuit that performs image data processing based on an output signal from the first line sensor when an image is read at a first resolution, and performs image data processing based on output signals from the first line sensor and the second line sensor when an image is read at a second resolution higher than the first resolution.

To attain the above object, in a third aspect of the present invention, there is provided an image reading method applied to an image reading apparatus including a first line sensor having a plurality of photoelectric conversion elements linearly arranged at a predetermined pitch in a main scanning direction, and a second line sensor having a plurality of linearly arranged photoelectric conversion elements and shifted from respective ones of the photoelectric conversion elements of the first line sensor by half the predetermined pitch in the main scanning direction, the second line sensor having a length in the main scanning direction shorter than that of the first line sensor, the method comprising a first image data processing step of performing image data processing based on an output signal from the first line sensor when an image is read at a first resolution, and a second image data processing step of performing image data processing based on output signals from the first line sensor and the second line sensor when an image is read at a second resolution higher than the first resolution.

To attain the above object, in a fourth aspect of the present invention, there is provided a program for causing a computer to implement an image reading method applied to an image reading apparatus including a first line sensor having a plurality of photoelectric conversion elements linearly arranged at a predetermined pitch in a main scanning direction, and a second line sensor having a plurality of linearly arranged photoelectric conversion elements and shifted from respective ones of the photoelectric conversion elements of the first line sensor by half the predetermined pitch in the main scanning direction, the second line sensor having a length in the main scanning direction shorter than that of the first line sensor, the program comprising a first image data processing module for performing image data processing based on an output signal from the first line sensor when an image is read at a first resolution, and a second image data processing module for performing image data processing based on output signals from the first and line sensor and the second line sensor when an image is read at a second resolution higher than the first resolution.

The above and other objects, features, and advantages of the invention will become more apparent from the following detailed description taken in conjunction with the accompanying drawings.

DETAILED DESCRIPTION OF THE PREFERRED EMBODIMENTS

The present invention will now be described with reference to the drawings showing preferred embodiments thereof.

First, a first embodiment of the present invention will be described.

Figure 1A:
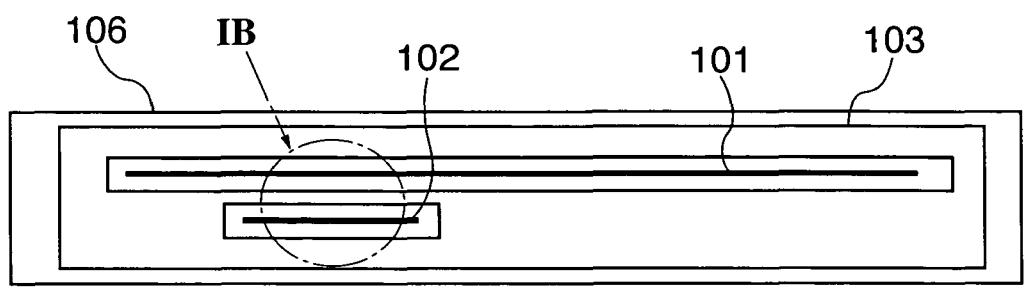
FIG. 1A is a plan view showing the structure or layout of a linear image sensor for use in an image reading apparatus according to a first embodiment of the present invention.
Figure 1B:
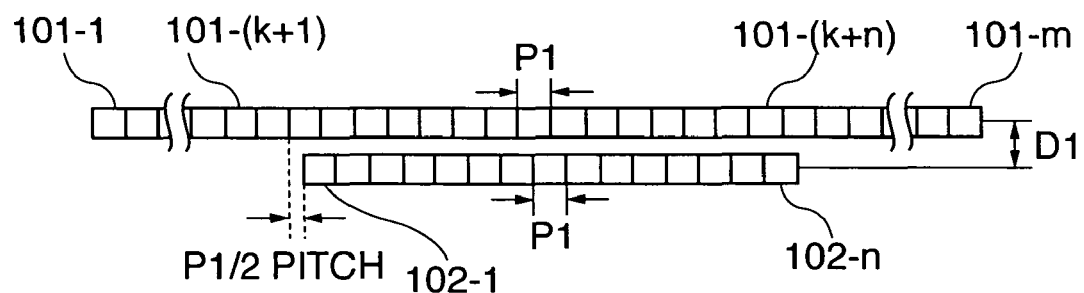
FIG. 1B is an enlarged view of a portion IB indicated in FIG. 1A.

FIG. 1A is a plan view showing the structure of a linear image sensor for use in an image reading apparatus according to the first embodiment of the present invention. FIG. 1B is an enlarged view of a portion IB indicated in FIG. 1A.

As shown in FIG. 1A, the linear image sensor is comprised of first and second sensors 101 and 102. The sensors 101 and 102 are arranged in parallel and in proximity to each other on a substrate 103 which is contained in a package 106. The second sensor 102 has a length in a main scanning direction (horizontal direction as viewed in FIG. 1A) shorter than that of the first sensor 101, and the second sensor 102 is disposed at a predetermined location in the main scanning direction relative to the first sensor 101. The length and position of the second sensor 102 are determined based on the size of a transparent original such as a photo film, which is read at an enhanced resolution, and a reading position of the transparent original on an original platen. An image on the transparent original set on the original platen is formed on the first and second sensors of the linear image sensor via lenses, not shown.

The first sensor 101 has an effective read (scan) range that completely covers the shorter side of a size A4 original, and here, it is 216 mm. The second sensor 102 has an effective read range which completely covers the shorter side of the image area of a 35 mm film as a transparent original, and here, it is 26 mm. In a linear image sensor that reads a large-sized photo film as a transparent original, the second sensor 102 may be configured to have the effective read range of 60 mm for such a large-sized photo original.

As shown in FIG. 1B, the first sensor 101 is comprised of a plurality of light receiving elements (photoelectric conversion elements) 101-1 to 101-m linearly arranged at a predetermined pitch P1. In FIG. 1B, reference numerals 101-($k$+1) to 101-($k$+n) denote light receiving elements of the light receiving elements 101-1 to 101-m, which face the second sensor 102. Similarly, the second sensor 102 is comprised of a plurality of light receiving elements (photoelectric conversion elements) 102-1 to 102-n linearly arranged at the same pitch P1 as that of the first sensor 101. The light receiving elements 102-1 to 102-n of the second sensor 102 are shifted by half the pitch (P1/2) in the main scanning direction from respective corresponding ones of the light receiving elements 101-($k$+1) to 101-($k$+n) of the first sensor 101.

Further, the first sensor 101 and the second sensor 102 are implemented as discrete chip components, and are arranged on the substrate 103 such that they are spaced from each other by a distance D1 in a sub scanning direction orthogonal or perpendicular to the main scanning direction.

The first sensor 101 is used to read a normal reflective original. Each of the light receiving elements 101-1 to 101-m converts an optical signal of the read image into an electric signal output. At this time, the supply of power and clock to the second sensor 102 is stopped to hold the second sensor 102 inoperative.

On the other hand, when a transparent original is read, which requires enhanced resolution reading, not only the first sensor 101 but also the second sensor 102 is activated. In this case, pixel signals are read out alternately from the light receiving elements 101-($k$+1) to 101-($k$+n) of the first sensor 101 and the light receiving elements 102-1 to 102-n of the second sensor 102 for image reading. For example, the pixel signal reading is carried out sequentially by the light receiving element 101-($k$+1) of the first sensor 101, the light receiving element 102-1 of the second sensor 102, the light receiving element 101-($k$+2) of the first sensing element 101, and so on in the mentioned order.

An image reading apparatus using the linear image sensor constructed above is not described here, and the same will be described in connection with second and subsequent embodiments given hereinbelow.

Now, a description will be given of the second embodiment.

Figure 2A:
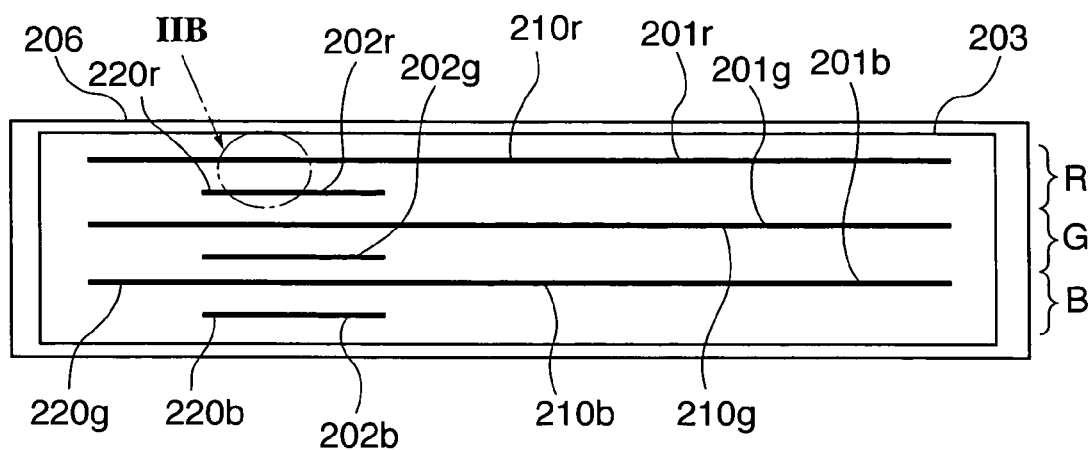
FIG. 2A is a plan view showing the structure of a linear image sensor for use in an image reading apparatus according to a second embodiment of the present invention.
Figure 2B:
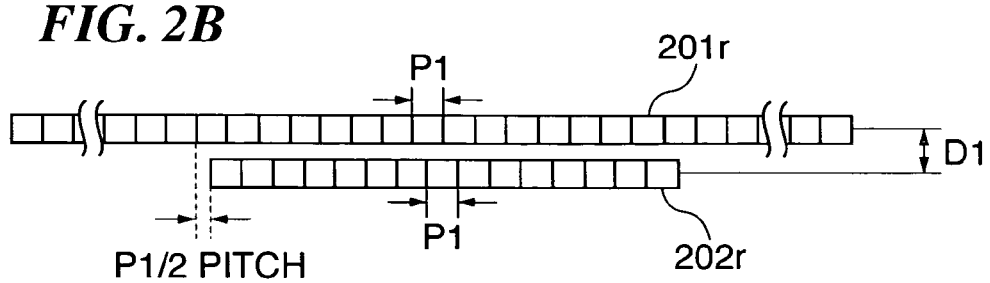
FIG. 2B is an enlarged view of a red (R) sensor portion IIB indicated in FIG. 2A.

FIG. 2A is a plan view showing the structure of a linear image sensor for use in an image reading apparatus according to the second embodiment of the present invention. FIG. 2B is an enlarged view of a red (R) sensor portion IIB indicated in FIG. 2A. The linear image sensor of the second embodiment is designed to read color images.

As shown in FIG. 2A, the linear image sensor of the second embodiment includes three rows of red (R) light receiving elements 201$r$, green (G) light receiving elements 201$g$, and blue (B) light receiving elements 201$b$, the light receiving elements of each row being arranged at a pitch P1, and these light receiving elements corresponding to the first sensor 101 in the first embodiment. Further, the linear image sensor includes three rows of red (R), green (G), and blue (B) light receiving elements 202$r$, 202$g$, and 202$b$, the light receiving elements of each row being arranged at the pitch P1, and these light receiving elements 202$r$, 202$g$, and 202$b$ corresponding to the second sensor 102 in the first embodiment. Further, as shown in FIG. 2A, a red (R) color filter 210$r$, a green (G) color filter 210$g$, and a blue (B) color filter 210$b$ are formed, respectively, on the light receiving elements 201$r$, 201$g$, and 201$b$ at light receiving surfaces thereof in optical paths thereto. Similarly, as shown in FIG. 2A, a red (R) color filter 220$r$, a green (G) color filter 220$g$, and a blue (B) color filter 220$b$ are formed, respectively, on the light receiving elements 202$r$, 202$g$, and 202$b$ at light receiving surfaces thereof in optical paths thereto. Each row of the light receiving elements 202$r$, 202$g$, and 202$b$ has a length in the main scanning direction shorter than that of each row of the light receiving elements 201$r$, 201$g$, and 201$b$, and is disposed at a predetermined location in the main scanning direction relative to the corresponding row of the light receiving elements 201$r$, 201$g$ and 201$b$, as in the first embodiment.

The red light receiving elements 201$r$ and the red light receiving elements 202$r$ are spaced in the sub scanning direction from each other by a distance D1, and are shifted in the main scanning direction from each other by half the pitch (P1/2) (see FIG. 2B). The arrangement of the green light receiving elements 201$g$ and 202$g$, and that of the blue light receiving elements 201$b$ and 202$b$ are identical or similar to that of the red light receiving elements.

These light receiving elements 201$r$, 201$g$ and 201$b$, and the light receiving elements 202$r$, 202$g$ and 202$b$ are formed on a common substrate 203 which is contained in a common package 206.

In the second embodiment as well, for image reading at a normal resolution, the light receiving elements 201$r$, 201$g$ and 201$b$ corresponding to the first sensor 101 of the first embodiment are used to read respective corresponding color components of an image. On the other hand, for image reading at an enhanced resolution, the light receiving elements 202$r$, 202$g$ and 202$b$ corresponding to the second sensor 102 of the first embodiment as well as portions of the light receiving elements 201$r$, 201$g$ and 201$b$, which face the light receiving elements 202$r$, 202$g$ and 202$b$, respectively, are used to respective corresponding color components of an image. Specifically, the light receiving elements 201$r$ and 202$r$ are used to read a red component, the light receiving elements 201$g$ and 202$g$ for a green component, and the light receiving elements 201$b$ and 202$b$ for a blue component. Further, Pixel signals for each color are generated alternately from the light receiving elements 201$r$, 201$g$ or 201$b$ and the light receiving elements 202$r$, 202$g$ or 202$b$ in a zigzag manner.

Figure 3:
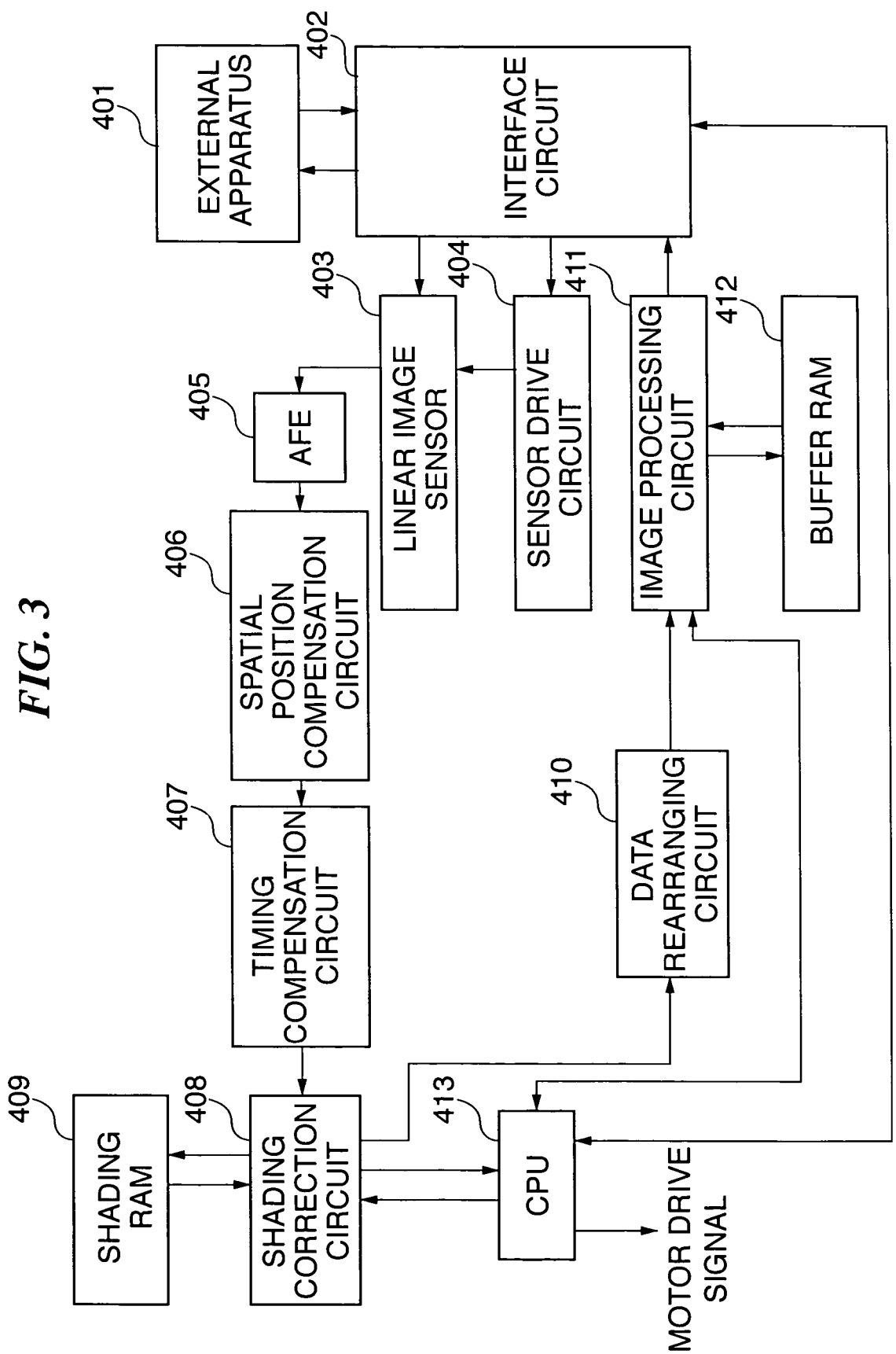
FIG. 3 is a block diagram showing the arrangement of the image reading apparatus incorporating the linear image sensor of FIGS. 2A and 2B.

FIG. 3 is a block diagram showing the arrangement of the image reading apparatus incorporating the linear image sensor according to the second embodiment.

A linear image sensor 403 in FIG. 3 corresponds to the linear image sensor of FIGS. 2A and 2B. In FIG. 3, blocks other than an external apparatus 401 such as a personal computer constitute the image reading apparatus.

When the image reading apparatus starts reading an image according to settings, such as reading resolution, inputted by a user through the external apparatus 401, an original on an original platen is read by the linear image sensor 403. A sensor drive circuit 404 controls the operation of the linear image sensor 403. When normal image resolution has been designated for image reading, the sensor drive circuit 404 puts the light receiving elements 201$r$, 201$g$ and 201$b$ of FIG. 2A (hereinafter referred to as "the first sensor") into operation. When enhanced resolution has been designated for image reading, both the light receiving elements 201$r$, 201$g$ and 201$b$ (first sensor), and the light receiving elements 202$r$, 202$g$ and 202$b$ (hereinafter referred to as "the second sensor") are put into operation.

Electric signals are output from the linear image sensor 403 and sent to an analog front end preprocessor (AFE) 405. The AFE 405 performs processing on the electric signals output from the linear image sensor 403, including amplification, DC offset compensation, and analog-to-digital (A/D) conversion, to thereby output digital image data.

As mentioned before, the sensing elements of the second sensor are shifted from those of the first sensor by half the pitch in the direction in which the sensing elements are arranged (main scanning direction). Thus, an image of the same position of an original in the main direction is read shifted in timing by half the pitch by one of the first and second sensors from the other sensor. Further, since the first and second sensors are spaced from each other by the distance D1 in the sub scanning direction, a spatial positional difference is caused between image data output from the first sensor and image data output from the second sensor. A spatial position compensation circuit 406 corrects the image data output from the first and second sensors of the linear image sensor 403 to compensate for the spatial positional difference corresponding to the distance D1 in the sub scanning direction. Specifically, the spatial position compensation circuit 406 delays processing on the image data read from the first sensor earlier, until the image data from the second sensor, obtained by reading the same position of the original, becomes ready for processing. In this way, positional difference compensation is carried out such that pixel signals from the first sensor and pixel signals from the second sensor correspond to the same position of the original with respect to the sub scanning direction. The compensation processing of the spatial position compensation circuit 406 is the same as described in U.S. Pat. No. 6,496,286 described hereinbefore as the prior art.

In a three-color linear image sensor, light receiving elements corresponding to red, green and blue are arranged in spaced relation to one another by a predetermined distance in the sub scanning direction. Accordingly, red, green and blue color data output from the linear image sensor 403 have a slight time difference from one another. A timing compensation circuit 407 sets a different delay time for each color data so as to delay output timing of image data, to thereby output red image data, green image data, and blue image data of the same pixel in the same timing.

A shading correction circuit 408 performs shading correction of image data. First, a reference white plate is illuminated by an original illuminating device, then, the resulting reflected light is read by the image sensor 403 to create data of a reference white level and store the same as shading correcting data in a shading RAM 409. After that, the shading correction circuit 408 performs the shading correction on image data obtained by reading an original, based on the stored shading correcting data.

When image reading with an enhanced resolution is carried out, a data rearranging circuit 410 is activated to rearrange image data output from the shading correction circuit 408 to thereby synthesize the image data output from the first and second sensors.

An image processing circuit 411 performs processing on the image data, such as gamma conversion, and packing for arranging image data according to an image reading mode (binary, 24 bit multi values, etc.) selected in advance by the external apparatus 401, and then stores the processed image data in a buffer RAM 412. Subsequently, the image processing circuit 411 reads out image data from the buffer RAM 412 and output the same to an interface circuit 402.

The interface circuit 402 transmits and receives control signals to and from and output image data to the external apparatus 401 as a host apparatus for the image reading apparatus of the present embodiment.

A CPU 413, which is implemented by a micro computer, provides various kinds of control of the image reading apparatus.

Figure 4:
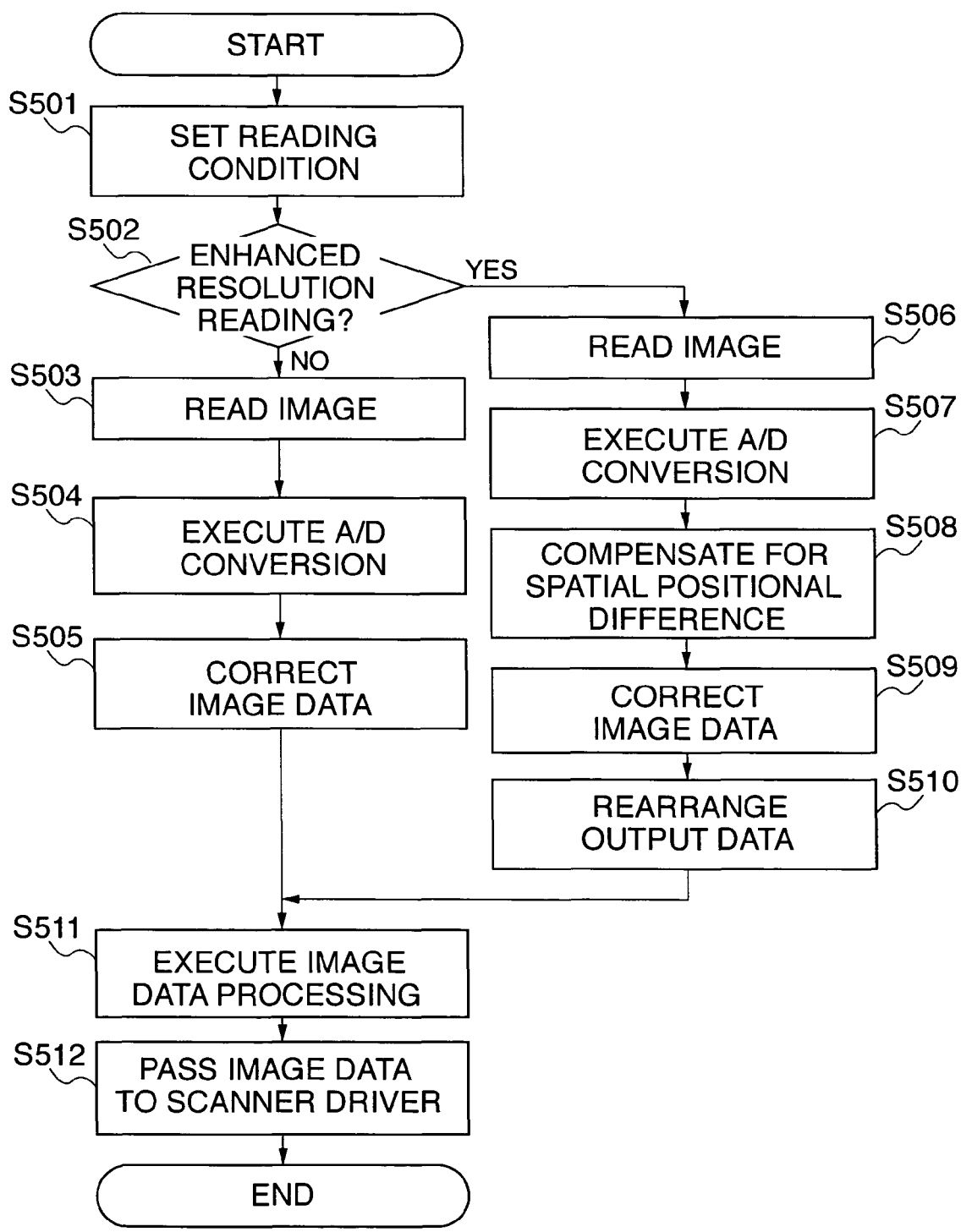
FIG. 4 is a flowchart showing an image reading process performed by the image reading apparatus of FIG. 3.

FIG. 4 is a flowchart showing an image reading process performed by the image reading apparatus of FIG. 3. This image reading process is started by the CPU 413 activating a scanner driver.

In a step S501, a reading mode and a resolution are set by a user via the external apparatus 401. The reading mode includes a reading mode for reading a reflective original and a reading mode for reading a transparent original. A sensor or sensors to be used is/are determined according to the selected reading mode and resolution. For example, if the reading mode for reading a reflective original has been set and a reading resolution of not more than 2400 dpi has been selected, the first sensor is selected for use. On the other hand, if the reading mode for reading a transparent original has been set and a reading resolution of higher than 2400 dpi (e.g. 4800 dpi) has been selected, both the first and second sensors are selected for use.

In a step S502, it is determined whether sensors have been set for enhanced resolution reading in the step S501, that is, whether both the first and second sensors have been selected. If the sensors have been selected for enhanced resolution reading, the process proceeds to a step S506. If a sensor has been set for normal resolution reading, the process proceeds to a step S503.

In the step S503, reading an original image with the normal resolution is carried out using the first sensor of the linear image sensor 403. An original is set on the original platen at an area thereof (almost the entire surface thereof) which can be read by the first sensor.

In a step S504, the AFE 405 carries out processing on electric signals from the linear image sensor 403, including amplification, DC offset compensation, and analog-to-digital (A/D) conversion, to thereby output digital image data.

In the next step S505, the spatial position compensation circuit 406 is inhibited from carrying out processing on the digital image data from the AFE 405, but the timing compensation circuit 407 is caused to delay the output timing of respective color component image data, and the shading correction circuit 408 is caused to carry out shading correction of the image data.

In a step S511, the image processing circuit 411 carries out gamma conversion of the image data from the shading circuit 408 based on a gamma curve selected in advance by the external apparatus 401 as a host. Further, the image processing circuit 411 performs packing of the image data according to an image output mode selected in advance by the external apparatus 401.

In a step S512, the image data obtained in this way is passed to the scanner driver. Then, the image reading process is terminated.

On the other hand, in the step S506, image reading at an enhanced resolution is performed using both the first and second sensors of the linear image sensor 403. It should be noted that in this case, an original is set on the original platen at a predetermined area thereof which can be read by the second sensor (the area corresponding to the length and position of the second sensor in the main scanning direction).

Next, in a step S507, the AFE 405 carries out processing on electric signals from the linear image sensor 403, including amplification, DC offset compensation, and analog-to-digital (A/D) conversion, to thereby output digital image data.

In the next step S508, the spatial position compensation circuit 406 compensates for the spatial positional difference of the digital image data received from the AFE 405.

Then, in a step S509, the timing compensation circuit 407 delays the output timing of the respective color components of the image data received from the spatial position compensation circuit 406, and the shading correction circuit 408 carries out shading correction on the timing corrected image data from the timing compensation circuit 407.

In the next step S510, the image data output from the first and second sensors of the linear image sensor 403 are rearranged into synthesized image data.

Then, in the step S511, gamma conversion is carried out on the image data according to the gamma curve selected in advance by the external apparatus 401 as a host, and packing of the image data is carried out according to the image output mode selected in advance by the external apparatus 401.

Finally, in the step S512, the image data obtained in this way is passed to the scanner driver, followed by termination of the image reading process.

As described above, according to the present embodiment, in image reading at a normal or low resolution, image data processing is carried out based on output data from only the first sensor, so that the processing time can be reduced. On the other hand, image reading at an enhanced resolution can be carried out without using an expensive linear image sensor with a high resolution. As a result, a low-cost image reading apparatus can be provided.

Further, a film original for image reading at an enhanced resolution is smaller in size than an ordinary original, and hence does not require reading the entire surface area of the original platen for enhanced resolution image reading. Therefore, by setting the area readable by the second sensor (the predetermined area on the original platen with each side almost equal to the length of the second sensor in the main scanning direction and determined by the position of the second sensor in the main scanning direction) suited to the size of the film original, high resolution image reading can be easily achieved using the first sensor for low resolution image reading and the second sensor with the same element density as the first sensor.

Next, a description will now be given of a third embodiment of the invention.

Figure 5A:
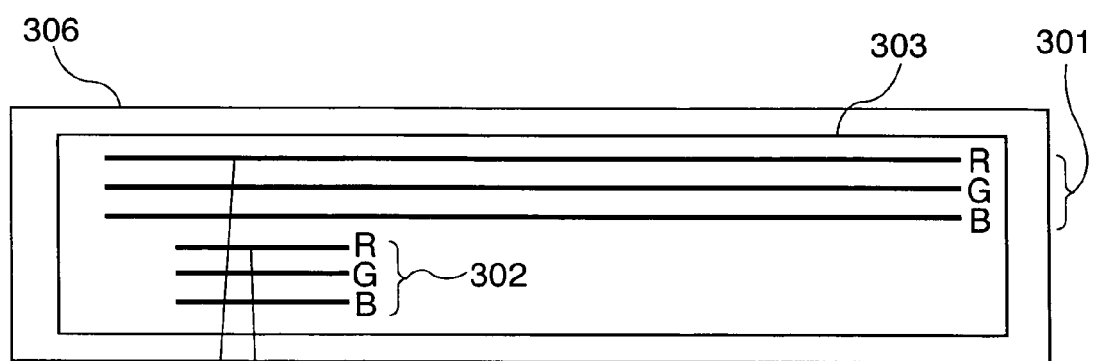
FIG. 5A is a plan view showing the structure of a linear image sensor for use in an image reading apparatus according to a third embodiment of the present invention.
Figure 5B:
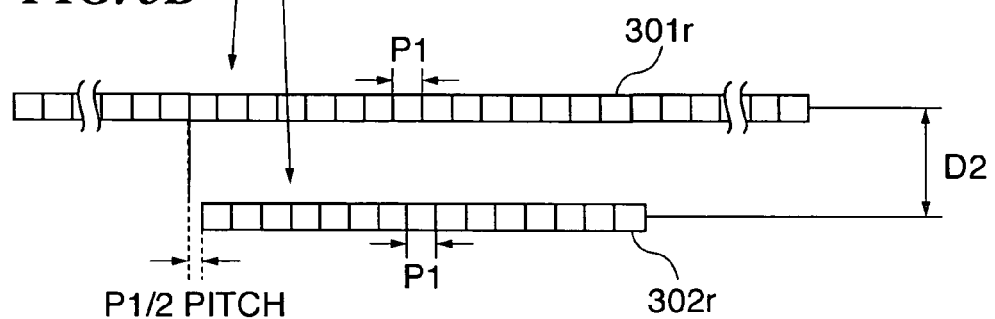
FIG. 5B is an enlarged view of a red (R) sensor portion indicated in FIG. 5A.

FIG. 5A is a plan views showing the structure of a linear image sensor for use in an image reading apparatus according to the third embodiment. FIG. 5B is an enlarged view of a red (R) sensor portion indicated in FIG. 5A. The linear image sensor of the third embodiment is designed to read color images, as is the case with the linear image sensor of the second embodiment.

The linear image sensor of the third embodiment is comprised of a first sensor 301 used to read red, green and blue (RGB) components of an image at a normal resolution, and a second sensor 302 used to read red, green and blue (RGB) components of an image at an enhanced resolution. The first sensor 301 is comprised of three rows of light receiving elements corresponding to red, green and blue components, respectively, each row of light receiving elements being arranged at a pitch P1 (for example, light receiving elements 301r corresponding to the red component are shown in FIG. 5B). Similarly, the second sensor 302 is comprised of three rows of light receiving elements corresponding to red, green and blue components, respectively, each row of light receiving elements being arranged at the same pitch P1 (for example, light receiving elements 302r corresponding to the red component are shown in FIG. 5B). Further, the three rows of light receiving elements of the first sensor 301 corresponding to red, green and blue components include a red (R) color filter, a green (G) color filter, and a blue (B) color filter (none of them are shown) formed thereon, respectively, at light receiving surfaces thereof in optical paths thereto. Similarly, the three rows of light receiving elements of the second sensor 302 corresponding to red, green and blue components include a red (R) color filter, a green (G) color filter, and a blue (B) color filter (none of them are shown) formed thereon, respectively, at light receiving surfaces thereof in optical paths thereto. The first and second sensors 301 and 302 are formed on a common substrate 303 which is contained in a common package 306. The light receiving elements of the first sensor 301 and the light receiving elements of the second sensor 302, which are associated with the same color component (for example, the light receiving elements 301r and 302r corresponding to the red (R) component) are arranged in spaced relation to each other in the sub scanning direction by a distance D2. Further, the light receiving elements of the second sensor 302 are shifted in the main scanning direction from those of the first sensor 301 by half the pitch (P1/2).

In normal resolution image reading, only the first sensor 301 is used, and in enhanced resolution image reading, portions of the first sensor 301 facing the second sensor 302 and second sensor 302 are used. As is distinct from the first and second embodiments, in the present embodiment with the above described arrangement of the first and second sensors, the enhanced resolution image reading is performed such that reading is first carried out by the light receiving elements of the first sensor 301 corresponding to the respective color components, and then reading is carried out by the light receiving elements corresponding to the respective color components of the second sensor 302.

Next, a description is given of a fourth embodiment of the present invention.

The operation of circuit in a linear image sensor of the present embodiment will be described with respect to the normal resolution image reading and the enhanced resolution image reading.

Figure 6A:
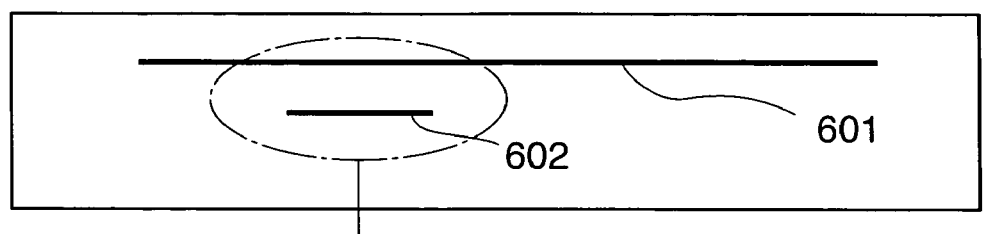
FIG. 6A is a plan view showing the structure of a linear image sensor for use in an image reading apparatus according to a fourth embodiment of the present invention.
Figure 6B:
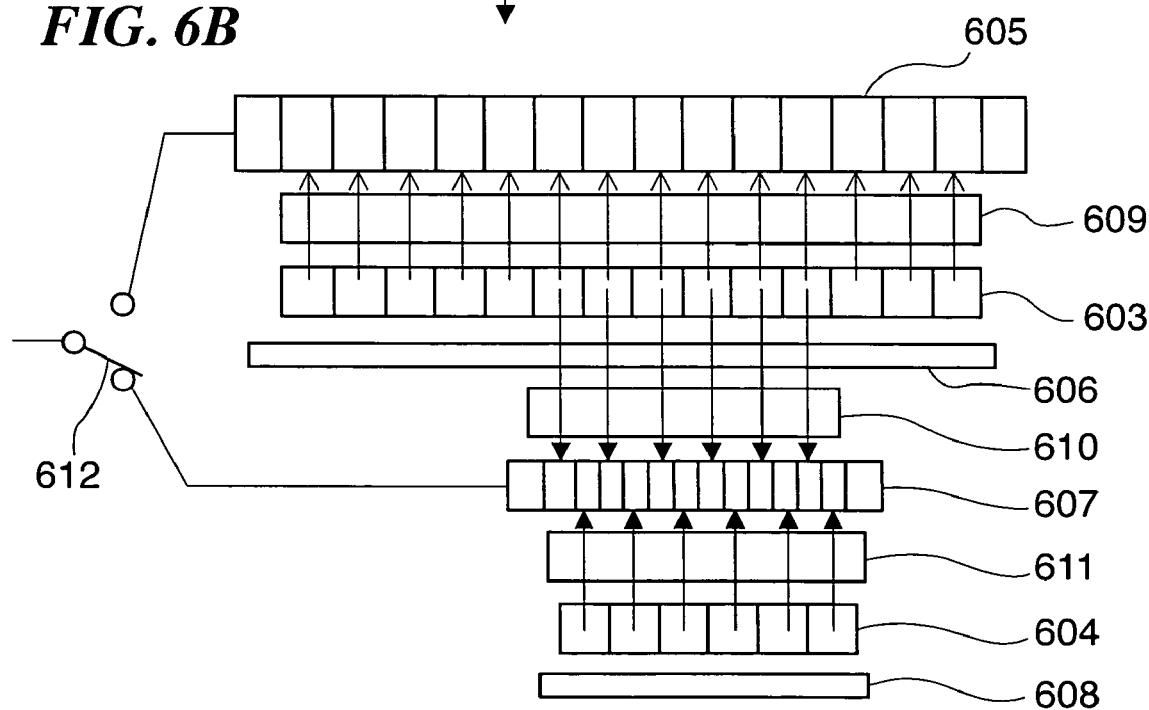
FIG. 6B is a schematic diagram showing the internal structure of the linear image sensor of FIG. 6A.

FIGS. 6A and 6B are schematic diagrams showing the structure of the linear image sensor according to the present embodiment. Specifically, FIG. 6A is a plan view showing the layout of the linear image sensor having first and second sensors 601 and 602. FIG. 6B is a schematic diagram showing the internal structure of the linear image sensor of FIG. 6A.

As shown in FIG. 6B, the linear image sensor of the present embodiment is comprised of a photo diode array 603 as the first sensor 601 formed of photo diodes arranged at a predetermined pitch, a photo diode array 604 as the second sensor 602 formed of photo diodes shifted from the photo diode array 603 as the first sensor 601 by half the pitch, a transfer register 605, a shift gate 609 that shifts electric charges from the photo diode array 603 as the first sensor to the transfer register 605, an overflow drain 606 that discharges extra charges accumulated in the photo diode array 603 as the first sensor during image reading, a transfer register 607 that transfers electric charges from the photo diode array 603 as the first sensor and the photo diode array 604 as the second sensor during enhanced resolution image reading, shift gates 610 and 611, an overflow drain 608 that discharges extra charges accumulated in the photo diode array 604 as the second sensor, and a switch 612.

When the normal or low resolution reading has been designated, the sensor 601 in FIG. 6A for normal resolution is operated to read an image. At this time, the transfer register 605 for normal resolution is used to transfer electric charge from the photo diode array 603 as the normal resolution sensor (see FIG. 6B). The transfer register 605 for normal resolution covers the entire length of the linear image sensor in the main scanning direction, and therefore can transfer image data read by all the photo diodes of the photo diode array 603 as the first sensor. During image reading, electric charges accumulated in the photo diode array 603 are transferred to the transfer register 605 through the shift gate 609, as indicated by upward arrows in FIG. 6B. Then, the electric charges are shifted in the transfer register 605, and are output as an electric signal via the switch 612 that is then connected to the transfer register 605.

When enhanced resolution reading has been designated, both the first and second sensors 601 and 602 of FIG. 6A are operated to read an image. Specifically in this case, the transfer register 607 that covers only an area where an image is read at enhanced resolution is used to transfer electric charge from the photo diode array 603 as the first sensor (see FIG. 6B). Of electric charges accumulated in the photo diode array 603, those electric charges in a portion of the photo diode array 603 facing the photo diode array 604 are transferred to the transfer register 607 through the shift gate 610, as indicated by arrows with dark shaded heads in FIG. 6B. Electric charges accumulated in portions of the photo diode array 603 which are not used for enhanced resolution image reading are discharged via the overflow drain 606. During enhanced resolution image reading, electric charges are also transferred from the photo diode array 604 to the transfer register 607 through the shift gate 611 concurrently with the transfer of electric charges from the photo diode array 603. Electric charges are transferred to the transfer register 607 alternately from the photo diode array 603 and the photo diode array 604 in such a manner that electric charge from one of the photo diode arrays 603 and 604 is transferred to every other element of the transfer register 607 (see the arrows with dark shaded heads in FIG. 6B). Then the electric charges are shifted in the transfer register 607 and output as an electric signal via the switch 612 that is then connected to the transfer register 607.

In both the normal resolution image reading and enhanced resolution image reading, the electric signal output from the linear image sensor is processed in the above described manner.

Although in the fourth embodiment, as the overflow drain 606, a single overflow drain is provided, extending along all the photo diodes of the photo diode array 603, alternatively, left and right separate overflow drains may be provided in facing relation to the photo diodes of the photo diode array 603 that do not face the shift gate 610 for enhanced resolution image reading. Although in the fourth embodiment, electric charges from the photo diode array 603 and electric charges from the photo diode array 604 are alternately transferred to every other element of the transfer register 607, alternatively, two transfer registers may be provided, which correspond to the respective photo diode arrays 603 and 604 so that electric charges transferred from one of the photo diode arrays to a corresponding one of the transfer registers are shifted in this transfer register. In the third embodiment of FIG. 5 in particular, it is preferred that such separate transfer registers are provided in correspondence to the respective photo diode arrays.

In the first through third embodiments described above, the linear image sensor may be implemented by a CCD, a CMOS, or any other type sensor insofar as it is suitable for converting light intensity to an electric signal. Alternatively, the linear image sensor may be implemented by a contact image sensor (CIS) based on the CCD or CMOS technology. Further, the present invention can also be applied to an image reading apparatus that does not employ a color filter, but uses LEDs such as red, green, and blue ones as light sources such that an original is illuminated sequentially by the LEDs for color image reading.

It is to be understood that the object of the present invention may also be accomplished by supplying a system or an apparatus with a storage medium in which a program code of software which realizes the functions of any of the above described embodiments is stored, and causing a computer (or CPU or MPU) of the system or apparatus to read out and execute the program code stored in the storage medium.

In this case, the program code itself read from the storage medium realizes the functions of any of the above described embodiments, and hence the program code and the storage medium on which the program code is stored constitute the present invention.

Examples of the storage medium for supplying the program code include a floppy (registered trademark) disk, a hard disk, a magnet-optical disk, a CD-ROM, a CD-R, a CD-RW, a DVD-ROM, a DVD-RAM, a DVD-RW, a DVD+RW, a magnetic tape, a non-volatile memory card, and a ROM. Alternatively, the program code may be downloaded via a network.

Further, it is to be understood that the functions of any of the above described embodiments may be accomplished not only by executing a program code read out by a computer, but also by causing an OS (operating system) or the like which operates on the computer to perform a part or all of the actual operations based on instructions of the program code.

Further, it is to be understood that the functions of any of the above described embodiments may be accomplished by writing a program code read out from the storage medium into a memory provided on an expansion board inserted into a computer or a memory provided in an expansion unit connected to the computer and then causing a CPU or the like provided in the expansion board or the expansion unit to perform a part or all of the actual operations based on instructions of the program code.

CROSS REFERENCE TO RELATED APPLICATION

This application claims priority from Japanese Patent Application No. 2004-273406 filed Sep. 21, 2004, which is hereby incorporated by reference herein.

What is claimed is:

1. A linear image sensor comprising:
a first line sensor having a plurality of photoelectric conversion elements linearly arranged at a predetermined pitch in a main scanning direction;
a second line sensor having a plurality of photoelectric conversion elements linearly arranged at the predetermined pitch in the main scanning direction and having a length in the main scanning direction shorter than that of said first line sensor, the photoelectric conversion elements of said second line sensor being shifted from the photoelectric conversion elements of said first line sensor by half the predetermined pitch in the main scanning direction;
a first transfer register that transfers electric charges from all the photoelectric conversion elements of said first line sensor; and
a second transfer register that has a length shorter than that of said first transfer register, wherein electric charges in only a portion of the photoelectric conversion elements of said first line sensor facing said second line sensor are transferred to the second transfer register, but electric charges in a portion of the photoelectric conversion elements of said first line sensor not facing said second line sensor are never transferred to the second transfer register, and electric charges in the photoelectric conversion elements of the second line sensor are transferred to the second transfer register, wherein said second line sensor is arranged in parallel to said first line sensor and spaced from said first line sensor by a predetermined distance in a sub scanning direction perpendicular to the main scanning direction.

2. A linear image sensor as claimed in claim 1, wherein:
said first line sensor comprises a plurality of line sensors having the plurality of photoelectric conversion elements linearly arranged at a same phase and at a same pitch in the main scanning direction;
said second line sensor comprises a plurality of line sensors having the plurality of photoelectric conversion elements linearly arranged at a same phase and at a same pitch in the main scanning direction;
the linear image sensor comprises a plurality of color filters corresponding to respective colors, arranged on respective to said plurality of line sensors of said first line sensor, and a plurality of color filters corresponding to the respective colors, arranged on respective optical paths to said plurality of line sensors of said second line sensor; and
one of said plurality of line sensors of said first line sensor corresponding to a first color and one of said plurality of line sensors of said second line sensor corresponding to the first color are arranged in proximity to each other, and another one of said plurality of line sensors of said first line sensor corresponding to a second color and another one of said plurality of line sensors of said second line sensor corresponding to the second color are arranged in proximity to each other.

3. A linear image sensor as claimed in claim 1, wherein:
said first line sensor comprises a plurality of line sensors having the plurality of photoelectric conversion elements linearly arranged at a same phase and at a same pitch in the main scanning direction;
said second line sensor comprises a plurality of line sensors having the plurality of photoelectric conversion elements linearly arranged at a same phase and at a same pitch in the main scanning direction;
the linear image sensor comprises a plurality of color filters corresponding to respective colors, arranged on respective to said plurality of line sensors of said first line sensor, and a plurality of color filters corresponding to the respective colors, arranged on respective optical paths to said plurality of line sensors of said second line sensor; and
one of said plurality of line sensors of said first line sensor corresponding to a first color and one of said plurality of line sensors of said first line sensor corresponding to a second color are arranged in proximity to each other, and another one of said plurality of line sensors of said second line sensor corresponding to the first color and another one of said plurality of line sensors of said second line sensor corresponding to the second color are arranged in proximity to each other.

4. A linear image sensor as claimed in claim 1, wherein said first line sensor has a reading range having a length corresponding to a shorter side of an A4 sized original.

5. A linear image sensor as claimed in claim 1, wherein said second line sensor has a reading range having a length corresponding to a shorter side of a photo film original.

6. An image reading apparatus comprising:
a linear image sensor comprising a first line sensor having a plurality of photoelectric conversion elements linearly arranged at a predetermined pitch in a main scanning direction, a second line sensor having a plurality of photoelectric conversion elements linearly arranged at the predetermined pitch in the main scanning direction and having a length in the main scanning direction shorter than that of said first line sensor, a first transfer register that transfers electric charges from all the photoelectric conversion elements of said first line sensor, and a second transfer register that has a length shorter than that of said first transfer register, wherein electric charges in only a portion of the photoelectric conversion elements of said first line sensor facing said second line sensor are transferred to the second transfer register, but electric charges in a portion of the photoelectric conversion elements of said first line sensor not facing said second line sensor are never transferred to the second transfer register, and electric charges in the photoelectric conversion elements of the second line sensor are transferred to the second transfer register, the photoelectric conversion elements of said second line sensor being shifted from the photoelectric conversion elements of said first line sensor by half the predetermined pitch in the main scanning direction, wherein said second line sensor is arranged in parallel to said first line sensor and spaced from said first line sensor by a predetermined distance in a sub scanning direction perpendicular to the main scanning direction; and
an image data processing circuit that performs image data processing based on an output signal from said first line sensor when an image is read at a first resolution, and performs image data processing based on output signals from said first line sensor and said second line sensor when an image is read at a second resolution higher than the first resolution.

7. An image reading method applied to an image reading apparatus including a first line sensor having a plurality of photoelectric conversion elements linearly arranged at a predetermined pitch in a main scanning direction, and a second line sensor having a plurality of linearly arranged photoelectric conversion elements and shifted from respective ones of the photoelectric conversion elements of the first line sensor by half the predetermined pitch in the main scanning direction, the second line sensor having a length in the main scanning direction shorter than that of the first line sensor, the method comprising:
a first image data processing step of performing image data processing based on an output signal from the first line sensor when an image is read at a first resolution; and
a second image data processing step of performing image data processing based on output signals from the first line sensor and the second line sensor when an image is read at a second resolution higher than the first resolution, wherein
in said first image data processing step, electric charges in all the photoelectric conversion elements of the first line sensor are transferred, and
in said second image data processing step, electric charges in only a portion of the photoelectric conversion elements of the first line sensor facing the second line sensor are transferred, but electric charges in a portion of the photoelectric conversion elements of the first line sensor not facing the second line sensor are never transferred, and electric charges in the photoelectric conversion elements of the second sensor are transferred.

8. A computer readable storage medium storing a program for causing a computer to implement an image reading method applied to an image reading apparatus including a first line sensor having a plurality of photoelectric conversion elements linearly arranged at a predetermined pitch in a main scanning direction, and a second line sensor having a plurality of linearly arranged photoelectric conversion elements and shifted from respective ones of the photoelectric conversion elements of the first line sensor by half the predetermined pitch in the main scanning direction, the second line sensor having a length in the main scanning direction shorter than that of the first line sensor, the program comprising:

- a first image data processing module for performing image data processing based on an output signal from the first line sensor when an image is read at a first resolution; and
- a second image data processing module for performing image data processing based on output signals from the first and line sensor and the second line sensor when an image is read at a second resolution higher than the first resolution, wherein said first image data processing module transfers electric charges in all the photoelectric conversion elements of the first line sensor, and wherein said second image data processing module transfers electric charges in only a portion of the photoelectric conversion elements of the first line sensor facing the second line sensor, but never transfers electric charges in a portion of the photoelectric conversion elements of the first line sensor not facing the second line sensor, and transfers electric charges in the photoelectric conversion elements of the second line sensor.

* * * * *